United States Patent
Kobayashi

[11] Patent Number: 6,166,104
[45] Date of Patent: Dec. 26, 2000

[54] HOT-MELT COLOR INK-JET RECORDING PROCESS

[75] Inventor: Naomichi Kobayashi, Nagoya, Japan

[73] Assignee: Brother Kogyo Kabushiki Kaisha, Nagoya, Japan

[21] Appl. No.: 09/048,318

[22] Filed: Mar. 26, 1998

[30] Foreign Application Priority Data

Mar. 31, 1997 [JP] Japan ........................................ 9-94510

[51] Int. Cl.⁷ ........................... C09D 11/10; C08L 77/06; B05D 5/06
[52] U.S. Cl. ....................... 523/160; 427/288; 525/92 B; 525/206
[58] Field of Search ..................... 523/160, 161; 106/31.29, 31.3, 31.31, 31.61, 31.62, 31.63; 427/288, 421, 466; 525/92 B, 96, 191, 206, 217

[56] References Cited

U.S. PATENT DOCUMENTS

| | | |
|---|---|---|
| 3,653,932 | 4/1972 | Berry et al. . |
| 4,390,369 | 6/1983 | Merrit et al. . |
| 4,469,543 | 9/1984 | Segal et al. ............................. 156/283 |
| 4,636,258 | 1/1987 | Hayashi et al. ......................... 524/277 |
| 4,659,383 | 4/1987 | Lin et al. . |
| 4,820,346 | 4/1989 | Nowak . |
| 4,870,118 | 9/1989 | Kinoshita et al. . |
| 5,531,819 | 7/1996 | Sawada .................................. 524/114 |
| 5,560,765 | 10/1996 | Sawada ................................. 106/31.3 |
| 5,592,204 | 1/1997 | Lin et al. . |
| 5,624,483 | 4/1997 | Fujioka ................................. 106/31.29 |
| 5,662,736 | 9/1997 | Sakai et al. .......................... 106/31.29 |
| 5,736,090 | 4/1998 | Yamamoto et al. .................... 264/255 |
| 5,980,621 | 11/1999 | Inaishi et al. ........................ 106/31.29 |

FOREIGN PATENT DOCUMENTS

| | | |
|---|---|---|
| 0 357 363 A2 | 3/1990 | European Pat. Off. . |
| 0 610 090 A1 | 8/1994 | European Pat. Off. . |
| 0 737 727 A2 | 10/1996 | European Pat. Off. . |
| 0 739 958 A2 | 10/1996 | European Pat. Off. . |
| 58-108271 | 6/1983 | Japan . |
| 59-22973 | 2/1984 | Japan . |
| 61-83268 | 4/1986 | Japan . |
| 62-48774 | 3/1987 | Japan . |
| 62-112627 | 5/1987 | Japan . |
| 62-295973 | 12/1987 | Japan . |
| 02238992 | 9/1990 | Japan . |
| 07316479 | 12/1995 | Japan . |

OTHER PUBLICATIONS

Billmeyer, Fred W.; Textbook of Polymer Science 3rd Ed., John Wiley and Sons, New York (p. 250), 1984.

Lewis Sr., Richard J.; Hawley's Condensed Chemical Dictionary 13th Ed., John Wiley and Sons, New York (pp. 34 and 819), 1997.

Morrison, Robert Thornton and Boyd, Robert Neilson; Organic Chemistry 5th Ed., Allyn and Bacon, Inc. Boston (p. 1249), 1987.

*Primary Examiner*—Vasu Jagannathan
*Assistant Examiner*—Callie E Shosho
*Attorney, Agent, or Firm*—Oliff & Berridge, PLC

[57] ABSTRACT

A hot-melt color ink-jet recording process comprises ejecting at least yellow, magenta and cyan to make a record. The yellow, magenta and cyan hot-melt inks comprises respectively a yellow colorant, a magenta colorant and a cyan colorant. Each hot-melt ink is prepared by mixing the corresponding colorant with a polyamide resin and a wax. In this recording process, at least one of the yellow and magenta hot-melt inks contains a 1-alkene/maleic anhydride copolymer.

17 Claims, No Drawings

HOT-MELT COLOR INK-JET RECORDING PROCESS

BACKGROUND OF THE INVENTION

1. Field of the Invention

This invention relates to a hot-melt color ink-jet recording process making use of a color hot-melt ink. More particularly, it relates to a color ink-jet recording process that can form images with a superior color reproduction when images are recorded by heating a color hot-melt ink to melt at a temperature higher than normal temperature.

2. Description of the Related Art

As inks used in conventional ink-jet recording systems, water-based inks employing water as a main solvent and oil-based inks employing an organic solvent as a main solvent are commonly used. Printed images obtained using the water-based inks have a poor water resistance in general. On the other hand, the use of oil-based inks can provide printed images having a good water resistance.

However, these water-based inks and oil-based inks are liquid at room temperature, and hence feathering tends to occur because ink rapidly permeates when images are printed on recording paper, and that a sufficient print density has been achievable with difficulty. Also, because these inks are liquid at all times, they tend to cause formation of deposits such as aggregates of dyes from inks during their storage, and such deposits have caused a great lowering of the reliability of ink-jet recording systems because of, e.g., clogging of nozzles.

In order to overcome such disadvantages of the conventional inks of a solution type, what is called a hot-melt ink-jet recording system making use of inks which are solid at normal temperature and melt upon heating are proposed, and various hot-melt inks used in the ink-jet recording system of this type are proposed. Stated specifically, U.S. Pat. No. 3,653,932 discloses an ink containing a dialkyl sebacate. U.S. Pat. No. 4,390,369 and Japanese Patent Application Laid-open No. 58-108271 disclose an ink containing a natural wax. Japanese Patent Application Laid-open No. 59-22973 discloses an ink containing a stearic acid. Japanese Patent Application Laid-open No. 61-83268 discloses an ink containing an acid or alcohol having 20 to 24 carbon atoms and also containing a ketone having a relatively higher melting point than these. Japanese Patent Application Laid-open No. 62-48774 discloses an ink containing a thermosetting resin having a high hydroxyl value, a solid organic solvent having a melting point lower than 150° C. and a small quantity of a dye substance. Japanese Patent Application Laid-open No. 62-112627 discloses an ink comprised of a colorant, a first solvent which is solid at room temperature and capable of liquefying upon heating to a temperature higher than the room temperature and a second solvent capable of dissolving the first solvent, being liquid at room temperature and being highly volatile. Japanese Patent Application Laid-open No. 62-295973 discloses an ink containing a synthetic wax having a polar group and a dye soluble in the wax.

These conventional hot-melt inks are set in color ink-jet recording apparatus, where the ink is liquefied by heating, and is ejected from an ejection mechanism while being kept liquid, to print images on a printing medium. However, color ink-jet recording carried out using conventional color hot-melt inks has a low color-forming performance and has not been able to form color images having a good color reproduction.

SUMMARY OF THE INVENTION

An object of the present invention is to provide a color ink-jet recording process that can achieve a fundamental performance and a good print quality which are required in hot-melt color inks for color ink-jet printers, and also can form color images with a superior color reproduction.

To achieve the above object, the present invention provides a hot-melt color ink-jet recording process comprising ejecting at least yellow, magenta and cyan hot-melt inks to make a record, the yellow, magenta and cyan hot-melt inks comprising respectively a yellow colorant, a magenta colorant and a cyan colorant and each hot-melt ink being prepared by mixing the corresponding colorant with a polyamide resin and a wax, wherein;

at least one of the yellow and magenta hot-melt inks contains a 1-alkene/maleic anhydride copolymer.

This and other objects, features and advantages of the present invention are described in or will become apparent from the following detailed description of the invention.

DETAILED DESCRIPTION OF THE INVENTION

The hot-melt color ink-jet recording process of the present invention is carried out using at least yellow, magenta and cyan hot-melt inks comprising respectively a yellow colorant, a magenta colorant and a cyan colorant where each hot-melt ink is prepared by mixing the corresponding colorant with a polyamide resin and a wax, and is characterized in that at least one of the yellow and magenta hot-melt inks contains a 1-alkene/maleic anhydride copolymer.

The polyamide resin used in the present invention is obtained by condensation polymerization of an amine and an acid. As the amine, hexamethylenediamine may be used, for example. As the acid, adipic acid, sebacic acid, trimellitic anhydride or a dimer acid may be used, for example. Also, as those having both the amine and the acid, there are 11-amino undecanoic acid and 12-amino dodecanoic acid. Any of these may be used in combination to thereby control a polyamide resin having the desired properties (amine value, acid value). As specific examples of commercially available polyamide resins usable in the present invention, they may include, e.g., the following: TOHMIDE 90, TOHMIDE 92, TOHMIDE 391, TOHMIDE 394, TOHMIDE 394N, TOHMIDE 395, TOHMIDE 397, TOHMIDE 509, TOHMIDE 535, TOHMIDE 558, TOHMIDE 560, TOHMIDE 575, TOHMIDE 1310, TOHMIDE 1350 (trade names; all available from Fuji Kasei Kogyo Co., Ltd.), POLYMIDE S-40HA, POLYMIDE S-40E, POLYMIDE S-150, POLYMIDE S-52, POLYMIDE S-185, POLYMIDE S-1510, POLYMIDE S-1525, POLYMIDE S-1635, POLYMIDE S-1962, POLYMIDE S-2007, POLYMIDE S-2153 (trade names; all available from Sanyo Chemical Industries, Ltd.), VERSAMIDE 335, VERSAMIDE 725, VERSAMIDE 744, VERSAMIDE 756, VERSAMIDE 930 and VERSAMIDE 940 (trade names; all available from Henkel Hakusui Corporation). In the present invention, any of these may be used alone or may be used in the form of a mixture of tow or more.

In the present invention, the polyamide resin may be used in such an amount that the total of polyamide resin is in the range from 5 to 50% by weight based on the total weight of the ink. If the polyamide resin in the ink is in a content less than 5% by weight, not only the melt viscosity high enough to eject ink in ink-jet recording systems can not be well achieved, but also the transparency of ink and the adhesion to printing mediums can not be ensured. On the other hand, if the content of the polyamide resin in the ink is more than 50% by weight, the ink may have so an excessively high melt viscosity that it is difficult to well eject ink at the operating temperature of printer heads used in ink-jet recording, and also that the ink may poorly soak into paper when applied onto paper, where the ink may come off the paper when the print surfaces are rubbed with the hand or the like and no good print quality can be well maintained. Accordingly, the polyamide resin may preferably be used in such an amount that it may be contained in the ink in an amount of from 10 to 30% by weight in total.

In the present invention, as the wax, waxes having a melting point of about 50° C. to 200° C. and stable to heat may be used. Stated specifically, such a wax may include conventional known waxes such as petroleum waxes, preferably paraffin wax or microcrystalline wax; vegetable waxes, preferably candelilla wax, carnauba wax, rice wax or jojoba solid wax; animal waxes, preferably beeswax, lanolin or spermaceti; mineral waxes, preferably montan wax; synthetic hydrocarbon waxes, preferably Fischer-Tropsch wax or polyethylene wax; hydrogenated waxes, preferably hardened castor oil or hardened castor oil derivatives; modified waxes, preferably montan wax derivatives, paraffin wax derivatives, microcrystalline wax derivatives or polyethylene wax derivatives; higher fatty acid or the like fat-and-oil type synthetic waxes, preferably behenic acid, stearic acid, palmitic acid, myristic acid or lauric acid; ketone waxes, preferably distearyl ketone; higher alcohol waxes, preferably stearyl alcohol or behenyl alcohol; hydroxystearic acids, preferably 12-hydroxystearic acid or 12-hydroxystearic acid derivatives; and fatty acid amides including lauric acid amide, stearic acid amide, oleic acid amide, erucic acid amide, ricinoleic acid amide, stearic acid ester amide, palmitic acid amide, behenic acid amide, brassidic acid amide, N-oleylstearic acid amide, N-stearylstearic acid amide, N-oleylpalmitic acid amide and N-stearylerucic acid amide; as well as ketones, preferably stearone or laurone; amines, preferably dodecylamine, tetradecylamine or octadecylamine; esters, preferably methyl stearate, octadecyl stearate, glycerol fatty acid ester, sorbitan fatty acid ester, propylene glycol fatty acid ester, ethylene glycol fatty acid ester or polyoxyethylene fatty acid ester; and polymer waxes. Any of these waxes may be used without any particular limitations. Any of these waxes may be used alone or in the form of a mixture of tow or more.

The wax described above may be used in such an amount that the total of wax is in the range from 20 to 90% by weight based on the total weight of the ink. If the wax in the ink is in a content less than 20% by weight, properties of other additives may come out overall and hence the ink may have so high or unstable a melting point that the ink may not sharply melt at ink-jet ejection temperature. If the wax is in a content more than 90% by weight, the melt viscosity high enough for the ink to function as an ink for ink-jet recording can not be achieved and also the ink may have a low adhesion to printing paper.

In the hot-melt color ink-jet recording process of the present invention, at least a yellow colorant, a magenta colorant and a cyan colorant are used as the colorants. These are solid at normal temperature, and is heated to melt into a liquid state when used. At least one, preferably both of a yellow color hot-melt ink containing the yellow colorant and a magenta color hot-melt ink containing the magenta colorant contain a 1-alkene/maleic anhydride copolymer, which may be in an amount of preferably from 1 to 30%, more preferably 5 to 15% by weight based on the total weight of the ink.

As the colorant used in the present invention, any dyes or pigments conventionally used in oil-based inks may be used. As to the pigments, those commonly used in the technical field of printing may be used without regard to organic or inorganic. Stated specifically, the pigments may include conventional known pigments as exemplified by carbon black, cadmium red, molybdenum red, chromium yellow, cadmium yellow, titanium yellow, chromium oxide, viridian, titanium cobalt green, ultramarine blue, Prussian blue, cobalt blue, azo pigments, phthalocyanine pigments, quinacridone pigments, isoindolinone pigments, dioxadine pigments, threne pigments, perylene pigments, perynone pigments, thioindigo pigments, quinophthalone pigments, and metal complex pigments, any of which may be used without any particular limitations so long as they have a primary particle size in the range of from 10 to 100 $\mu$m. Any of these pigments may be used in combination.

As to the dyes, any dyes conventionally used in oil-based inks may be used, and may preferably include oil-soluble dyes such as azo dyes, disazo dyes, metal complex dyes, naphthol dyes, anthraquinone dyes, indigo dyes, carbonium dyes, quinoneimine dyes, cyanine dyes, quinoline dyes, nitro dyes, nitroso dyes, benzoquinone dyes, naphthoquinone dyes, xanthene dyes, phthalocyanine dyes, and metal phthalocyanine dyes. Any of these dyes may be used in combination.

In the present invention, either of the dye and the pigment may be used as the colorant, but it is preferable to use a soluble dye having a good thermal stability and a good solubility in other vehicles. Any of these colorants may preferably be contained in the ink in an amount of from 0.1% by weight to 10% by weight in order for the ink to have a sufficient color forming performance, more preferably from 0.5% by weight to 8% by weight taking account of color forming performance when printed by printers, and still more preferably from 1% by weight to 5% by weight in order to ensure not to cause the deposition of dye or aggregation of pigment from ink that may be caused by thermal changes when printers are operated.

In the present invention, the color reproduction can be represented by hues and chroma. As specific numerical values, these can be represented by the L*a*b* units. L* is lightness, and the hues and chroma can be represented by *a*b*. In general, what is meant by "good color reproduction" is that the value of chroma $\sqrt{((a^*)^2+(b^*)^2)}$ determined from a* and b* is greater. (The greater, the better.)

The 1-alkene/maleic anhydride copolymer usable in the present invention may include, e.g., the following: DIA-CALNA PA-30 (trade name; available from Mitsubishi Chemical Industries Limited), POWAX (trade name; available from Nippon Oil Co., Ltd.), etc. In the present invention, any of these may be used alone or in the form of a mixture of two or more. In the present invention, the 1-alkene/maleic anhydride copolymer may be used in such an amount that the total of the 1-alkene/maleic anhydride copolymer is in the range of from 1 to 30% by weight based on the total weight of the ink. If the 1-alkene/maleic anhydride copolymer in the ink is in a content less than 1% by weight, no sufficient color reproduction may be achieved. If on the other hand it is more than 30% by weight, the ink may have a high viscosity to have a poor transparency, making it impossible to satisfy the properties required in inks.

Examples of alkene monomers used for preparing the 1-alkene/maleic anhydride copolymer include compounds represented by the formula "$C_nH_{2n+1}$", where n is an integer of preferably from 26 to 60. These alkene monomers can be copolymerized alone with maleic anhydride or in combination of 2 kinds or more therewith.

The above vehicles used in the present invention and some other vehicles and additives optionally used are all solid at normal temperature. Accordingly, when the hot-melt ink of the present invention is prepared, it is necessary to melt all of them at a temperature higher than their melt temperatures to well mix and uniformly disperse them. So long as such an object can be achieved, there are no particular limitations on the means for preparing the hot-melt ink of the present invention, and any desired means may be used.

A procedure for producing the hot-melt ink of the present invention will be described below. The respective vehicles used in the present invention and other vehicles and additives optionally used are charged into a container, the former being in the proportions as previously described and the latter being in the proportions within such ranges that do not damage the performance of the hot-melt ink of the present invention, and are melted by heating at a temperature higher than the highest melt temperature among the melt temperatures of the vehicles and other additives optionally used, usually at a temperature of from 70 to 250° C., and preferably form 100 to 200° C., in approximation, and then a colorant is charged. After the vehicles and other additives optionally used have been melted, a stirrer is rotated at a rotational speed and for a time, high and long enough to obtain a uniform mixture, usually from 200 to 10,000 rpm, and preferably from 500 to 5,000 rpm, and usually from tens of minute to several hours, and preferably from 1 to 2 hours, to thoroughly stir and mix the mixture. The stirring and mixing are carried out until no agglomerate remains as confirmed on an optical microscope (about 200 magnifications), taking a drop of the mixture on its slide glass. After the stirring and mixing are completed, the resultant mixture is put in a filtering apparatus in a molten state to effect filtration. Non-uniform substances are filtered off, and the substance having passed through a filter is collected as a final hot-melt ink.

EXAMPLES

To exemplify the present invention, Examples will be given below.

Example 1

VERSAMIDE 335 (trade name; available from Henkel Hakusui Corporation) as the polyamide resin, DIACALNA PA30L (trade name; available from Mitsubishi Chemical Industries Limited) as the 1-alkene/maleic anhydride copolymer and, as the wax, stearic acid amide wax (AMIDE AP-1, trade name; available from Nippon Kasei Chemical Co., Ltd.) and ketone wax (T-1, available from Kao Corporation) were charged into an apparatus in the following quantities, and were heat melted at a temperature of 130° C. and then an oil-soluble yellow dye C.I. Solvent Yellow 162 (NEOPEN YELLOW 075, trade name; available from BASF Corp.) was charged as the colorant. These were stirred and mixed by means of a dissolver at 1,000 rpm for about 1 hour. A drop of the resultant mixture was taken on a slide glass and observed using an optical microscope (200 magnifications) to make sure that no agglomerate was present. The mixture thus obtained was filtered by means of a heat filtering apparatus manufactured by Toyo Roshi K.K., using a 0.8 μm glass fiber filter GA200 (available from Toyo Roshi K.K.). The mixture having passed the filter was obtained as a hot-melt ink.

| VERSAMIDE 335 | 32 parts by weight |
| DIACALNA PA30L | 10 parts by weight |
| AMIDE AP-1 | 13 parts by weight |
| T-1 | 43 parts by weight |
| NEOPEN YELLOW 075 | 2 parts by weight |

Example 2

Using the same components and in the same quantities as described in Example 1 except that the colorant yellow dye C.I. Solvent Yellow 162 was replaced with Solvent Red 49, the procedure as described in Example 1 was repeated to obtain a hot-melt ink.

Comparative Example 1

Using VERSAMIDE 335 (trade name; available from Henkel Hakusui Corporation) as the polyamide resin, stearic acid amide wax (AMIDE AP-1, trade name; available from Nippon Kasei Chemical Co., Ltd.) and ketone wax (T-1, available from Kao Corporation) as the wax, and an oil-soluble blue dye C.I. Solvent Blue 70 as the colorant in the quantities shown below, the procedure as described in Example 1 was repeated to obtain a hot-melt ink.

| VERSAMIDE 335 | 37 parts by weight |
| AMIDE AP-1 | 13 parts by weight |
| T-1 | 48 parts by weight |
| C.I. Solvent Blue 70 | 2 parts by weight |

Comparative Example 2

Using the same components and in the same quantities as described in Example 1 except that the colorant yellow dye C.I. Solvent Yellow 162 was replaced with Solvent Blue 70, the procedure as described in Example 1 was repeated to obtain a hot-melt ink.

The hot-melt inks obtained in Examples 1 to 2 and Comparative Examples 1 and 2 were each melted on a hot plate heated to 110° C., and then coated on an OHP (overhead projector) sheet (PP-2500, available from Sumitomo 3M Limited) using a wire-wound rod (winding wire diameter: 0.9 mm), followed by colorimetry using a colorimeter manufactured by Suga Shikenki K.K. to determine $L^*a^*b^*$. Chroma was further determined from $a^*b^*$. Results obtained are shown in Table 1.

TABLE 1

|  | Colorant | L* | a* | b* | Chroma |
|---|---|---|---|---|---|
| Example: | | | | | |
| 1 | Yellow | 93.48 | −21.06 | 98.78 | 101.00 |
| 2 | Magenta | 48.21 | 97.40 | −51.31 | 109.63 |
| Comparative Example: | | | | | |
| 1 | Cyan | 72.53 | −44.71 | −30.44 | 54.09 |
| 2 | Cyan | 75.76 | −44.08 | −19.47 | 48.19 |

As can be seen from Table 1, the yellow and magenta hot-melt inks obtained in Examples 1 to 2 have higher chroma than the cyan hot-melt inks obtained in Comparative Examples 1 and 2.

The hot-melt cyan ink of Comparative Example 2 using 1-alkene/maleic anhydride copolymer has lower chroma than that of Comparative Example 1 using no 1-alkene/maleic anhydride copolymer.

Thus, according to the hot-melt color ink-jet recording process of the present invention, images with a superior color reproduction can be obtained.

The entire disclosure of the specification, summary and claims of Japanese Patent Application No. 9-094510 is herein incorporated by reference in its entirety.

What is claimed is:

1. A hot-melt color ink-jet recording process comprising ejecting at least yellow, magenta and cyan hot-melt inks to make a record; said yellow, magenta and cyan hot-melt inks comprising respectively a yellow colorant, a magenta colorant and a cyan colorant and each hot-melt ink being prepared by mixing the corresponding colorant with a polyamide resin and a wax, wherein;

at least one of the yellow and magenta hot-melt inks contains a 1-alkene/maleic anhydride copolymer.

2. The process according to claim 1, wherein at least one of the yellow and magenta hot-melt inks contains the 1-alkene/maleic anhydride copolymer in an amount of from 1 to 30% by weight.

3. The process according to claim 2, wherein at least one of the yellow and magenta hot-melt inks contains the 1-alkene/maleic anhydride copolymer in an amount of from 5 to 15% by weight.

4. The process according to claim 1, wherein both of the yellow and magenta hot-melt inks contain a 1-alkene/maleic anhydride copolymer.

5. The process according to claim 4, wherein both of the yellow and magenta hot-melt inks contain the 1-alkene/maleic anhydride copolymer in an amount of from 1 to 30% by weight, respectively.

6. The process according to claim 5, wherein the both of the yellow and magenta hot-melt inks contain the 1-alkene/maleic anhydride copolymer in an amount of from 5 to 15% by weight, respectively.

7. The process according to claim 1, wherein said wherein the polyamide resin is prepared by the condensation polymerization of hexamethylenediamine with adipic acid, sebacic acid, trimellitic anhydride or a dimer acid, or by self-condensation polymerization of 11-amino undecanoic acid or 12-amino dodecanoic acid.

8. The process according to claim 1, wherein the polyamide resin is contained in an amount of from 5% to 50% by weight based on the total of the hot-melt ink.

9. The process according to claim 8, wherein the polyamide resin is contained in an amount of from 10% to 30% by weight based on the total of the hot-melt ink.

10. The process according to claim 1, wherein the wax has a meting point of from 50 to 200° C.

11. The process according to claim 1, wherein the wax is selected from petroleum waxes, vegetable waxes, animal waxes, mineral waxes, synthetic hydrocarbon waxes, hydrogenated waxes, modified waxes, higher fatty acid waxes, ketone waxes, higher alcohol waxes, hydroxystearic acids, fatty acid amides, ketone waxes, amine waxes, ester and polymer waxes.

12. The process according to claim 1, wherein the colorant is contained in an amount of from 0.1% to 10% by weight based on the total weight of the ink.

13. The process according to claim 12, wherein the colorant is contained in an amount of from 0.5% to 8% by weight based on the total weight of the ink.

14. The process according to claim 13, wherein the colorant is contained in an amount of from 1% to 5% by weight based on the total weight of the ink.

15. The process according to claim 1, wherein an azo dye is used as the yellow colorant.

16. The process according to claim 15, wherein a xanthene dye is used as the magenta colorant.

17. The process according to claim 1, wherein a xanthene dye is used as the magenta colorant.

* * * * *